United States Patent
Wang

(10) Patent No.: US 7,455,152 B2
(45) Date of Patent: Nov. 25, 2008

(54) DISC BRAKE CALIPER

(75) Inventor: Nui Wang, Croydon (AU)

(73) Assignee: PBR Australia Pty Ltd. (AU)

( * ) Notice: Subject to any disclaimer, the term of this patent is extended or adjusted under 35 U.S.C. 154(b) by 514 days.

(21) Appl. No.: 10/776,539

(22) Filed: Feb. 9, 2004

(65) Prior Publication Data

US 2005/0000757 A1    Jan. 6, 2005

Related U.S. Application Data

(63) Continuation of application No. PCT/AU02/01067, filed on Aug. 8, 2002.

(30) Foreign Application Priority Data

Aug. 8, 2001  (AU) ..................... PR6888

(51) Int. Cl.
*F16D 55/00* (2006.01)
(52) U.S. Cl. .................. 188/72.4; 188/72.8; 188/156; 188/106 P
(58) Field of Classification Search ............. 188/72.1, 188/72.4, 72.7, 72.8, 156–165, 71.1, 73.31, 188/106 P, 106 A, 106 F, 106 R, 344; 303/20, 303/13–15, 9.61, 9.64, 9.63, 9.75
See application file for complete search history.

(56) References Cited

U.S. PATENT DOCUMENTS

| | | | | |
|---|---|---|---|---|
| 3,318,421 | A | * | 5/1967 | De Hoff et al. .......... 188/106 F |
| 3,342,291 | A | * | 9/1967 | Warwick et al. ........... 188/71.8 |
| 3,422,933 | A | * | 1/1969 | Flory et al. ................ 188/72.2 |
| 3,433,333 | A | * | 3/1969 | Swift ....................... 188/196 B |
| 4,438,629 | A | * | 3/1984 | Sato et al. ..................... 60/579 |
| 4,465,322 | A | * | 8/1984 | Hayashi ..................... 303/9.64 |

(Continued)

FOREIGN PATENT DOCUMENTS

DE    004210828 A1  *  11/1992

(Continued)

OTHER PUBLICATIONS

PCT/IPEA/409.*

(Continued)

*Primary Examiner*—Bradley T King
(74) *Attorney, Agent, or Firm*—Lerner, David, Littenberg, Krumholz & Mentlik, LLP

(57) ABSTRACT

A disc brake caliper for use with a disc brake rotor having a first side and a second side. The caliper further includes a first mounting portion and a second mounting portion each positioned adjacent one side of the disc brake rotor. The caliper further includes brake pads disposed adjacent the respective mounting portions such that brake pads are on opposite sides of the disc brake rotor and in facing relationship therewith. Further, the disc caliper includes a hydraulic service brake actuator and an electric parking brake actuator, each of which is operable independently of the other. Each of the actuators are arranged for actuation against a second side of the first brake pad for displacing the first brake pad away from the first mounting portion and into engagement with the disc brake rotor. The hydraulic service brake and the electric parking brake actuators have positions of actuation on the second side of the first brake pad at positions spaced apart.

13 Claims, 1 Drawing Sheet

U.S. PATENT DOCUMENTS

| | | | | |
|---|---|---|---|---|
| 4,598,954 | A * | 7/1986 | Hayashi | 303/9.61 |
| 4,602,702 | A * | 7/1986 | Ohta et al. | 188/72.1 |
| 5,090,518 | A * | 2/1992 | Schenk et al. | 188/72.1 |
| 5,148,894 | A * | 9/1992 | Eddy, Jr. | 188/72.6 |
| 5,161,650 | A * | 11/1992 | Taig | 188/72.8 |
| 5,682,965 | A * | 11/1997 | Prinzler | 188/72.4 |
| 6,273,523 | B1 * | 8/2001 | Wakabayashi et al. | 303/9.61 |
| 6,325,182 | B1 * | 12/2001 | Yamaguchi et al. | 188/72.8 |
| 6,412,608 | B1 * | 7/2002 | Mohr et al. | 188/72.9 |
| 6,505,714 | B1 * | 1/2003 | Ward | 188/72.1 |
| 2004/0222049 | A1 * | 11/2004 | Nowak et al. | 188/72.1 |

FOREIGN PATENT DOCUMENTS

| | | | |
|---|---|---|---|
| DE | 019648581 A1 | * | 5/1998 |
| DE | 019913939 A1 | * | 9/1999 |
| WO | WO88/04741 | * | 6/1988 |
| WO | WO 98/05879 | * | 2/1998 |
| WO | WO 03/014588 A1 | * | 2/2003 |
| WO | WO 03/023246 A1 | * | 3/2003 |
| WO | WO 03/067113 A1 | * | 8/2003 |

OTHER PUBLICATIONS

Supplementary European Search Report.*
Annex to European Search Report.*

* cited by examiner

DISC BRAKE CALIPER

CROSS REFERENCE TO RELATED APPLICATIONS

This application is a continuation of International Application No. PCT/AU02/01067, filed Aug. 8, 2002 and published in English under International Publication No. WO 03/014588 on Feb. 20, 2003, and claims the priority of Australian Patent Application No. PR6888 filed Aug. 21, 2001. The entire disclosure of International Application No. PCT/AU02/01067 and Australian Patent Application No. PR6888 are incorporated herein by reference.

BACKGROUND OF THE INVENTION

The present invention relates to a disc brake caliper for an automotive vehicle such as a car or a motorcycle, and in particular, the invention relates to a caliper which includes both a service and a parking brake facility. A caliper of this kind, which is operable in both service and parking brake modes, can be termed an "integral disc brake caliper" and that terminology will be used to describe such a caliper hereinafter throughout this specification.

Integral disc brake calipers have been devised in the past and these typically have involved a hydraulic service brake actuator including a hydraulically driven piston, and a parking brake actuator which acts through a suitable mechanism to drive the piston in the manual parking brake mode. The arrangement is such that the hydraulic actuator is operable to shift the piston outwardly of a piston cylinder in which it is disposed, to engage a disc brake pad and to push the pad into engagement with the disc rotor. By known means, engagement of the brake pad with the disc rotor causes a second brake pad disposed on the opposite side of the rotor to shift into engagement with that side of the rotor and thus the rotor becomes sandwiched between the brake pads, producing a braking effect.

The parking brake actuator in such calipers is operable to produce the same movement of the disc brake pads to sandwich the rotor and in the known arrangements, the parking brake actuator has been operable to displace the piston of the hydraulic actuator into engagement with the respective brake pad. To achieve that displacement, the parking brake actuator has been disposed within, or partly within the cylinder which houses the piston, to act on the piston when the parking brake is to be actuated. In this type of arrangement, the construction of the caliper can be quite complicated in order to accommodate the parking brake actuator partly or fully within the piston cylinder and in particular, the complicated nature of the caliper arises somewhat because accommodation of the parking brake actuator in the piston cylinder introduces at least an additional leakage path, so increasing the likelihood of leakage from the piston cylinder. Because there is a need to properly seal against the increased likelihood of leakage this invariably complicates the construction and reliability of the caliper.

In a different arrangement which is known to the applicant, the parking brake actuator is arranged to act on the piston, but outside of the piston cylinder. This arrangement advantageously alleviates the difficult and complicated sealing requirements of the other known forms of integral disc brake calipers, but the arrangement still requires a complicated construction for rerouting or redirecting the eccentric actuating load which arises in such an arrangement, back to the piston, which detracts from its usefulness, and increases its potential for failure. The arrangement lacks stiffness and therefore the displacement efficiency of the parking brake actuator is poor. Accordingly, there is a need for a greater input displacement to achieve the piston displacement necessary to properly apply the parking brakes. Further, the greater displacement required to apply the parking brakes can mean that the time taken for application thereof, is increased.

A further disadvantage in relation to each of the aforedescribed actuators is that failure of one of the service or parking brake actuators can affect the other. This may occur for one or more of a variety of reasons. For example, if the piston of the hydraulic actuator jams, then neither of the service or parking brakes will be operable. Thus, the shared componentry of the actuators can compromise the integrity of the caliper.

SUMMARY OF THE INVENTION

It is an object of the present invention to provide a disc brake caliper operable in each of service and parking brake modes, which overcomes or at least alleviates drawbacks of the prior art. It is a further object of the invention to provide a disc brake caliper of the integral kind, which is of reduced complexity compared with prior art arrangements.

A disc brake caliper according to the present invention includes a hydraulic actuator for service brake actuation and an electric actuator for parking brake actuation and is characterised in that each of the actuators includes actuating means which is arranged for actuation against the rear of a disc brake pad, with the positions of actuation being spaced apart.

A disc brake caliper of the above kind is distinguished from the prior art because the electric actuator includes actuating means arranged for actuation against the rear of the disc brake pad, which is separate from the actuating means (normally a hydraulic piston) of the hydraulic actuator. Thus, the electric actuator is not required to interact with the hydraulic actuator, such as to penetrate into the piston cylinder of the hydraulic actuator, nor is it required to act on the hydraulic piston, either inside or outside of the piston cylinder. Accordingly, the sealing difficulties experienced with prior art integral disc brake calipers are not apparent in a caliper according to the invention. Moreover, because the electric actuator is operable without interaction with the actuating means of the hydraulic actuator, the complicated prior art connection between the hydraulic piston and the electric actuator is not required and the caliper can have improved reliability because failure of one of the service or parking actuators does not affect the other.

In a preferred arrangement, a disc brake caliper according to the present invention includes a housing and an anchor bracket which are connected for relative movement during brake actuation. The housing has a bridge section which in use, bridges a disc brake rotor, and a pair of brake pad mounting portions which extend substantially perpendicular to the bridge section for disposal in use on either side of the rotor. A brake pad can be mounted on each mounting portion in facing relationship with opposite sides of the rotor. The caliper further includes a hydraulic service brake actuator and an electric parking brake actuator, each of which includes actuating means for actuation against the rear of one of the pair of disc brake pads, for displacing that pad away from the respective mounting portion and into engagement with one side of the rotor. Upon engagement of the pad with the rotor, the other of the pair of pads is displaced toward the opposite side of the rotor through relative movement between the housing and the anchor bracket, to sandwich the rotor and apply a braking load.

It will be convenient hereinafter to describe the electric and hydraulic actuators as including actuating means in the form of actuating members and in relation to the hydraulic actuator, the actuating member will be described as a piston which is disposed within a cylinder. It is to be appreciated however, that the actuating means of each actuator may be of any suitable form for actuation against the rear face of the disc brake pad and in particular, the hydraulic actuator may include actuating means which is other than a piston.

A typical hydraulic caliper of the prior art may include a single piston or a twin piston arrangement. Further pistons can be employed, but these are generally in heavy duty vehicles and while such calipers are within the scope of the invention, the invention is envisaged to be applicable principally to single or twin piston arrangements.

In a disc brake caliper according to the invention, the piston of the hydraulic actuator preferably engages the rear of a disc brake pad at a position or along a line of action so that the friction lining supported by the pad and which faces the rotor applies a substantially even pressure to the rotor across the face of the friction lining. This is preferred to ensure even wear of the friction lining, to maximise its life and to provide maximum braking efficiency. This is achieved in a single piston caliper, by the piston engaging the rear of the disc brake pad through a position generally central of the pad, or through a central region of the pad. The central nature of this engagement is due to the generally symmetric construction of brake pads. However, the objective is to provide engagement in the region of the effective pressure centre of the brake pad to achieve even wear of the friction lining, which typically is at the centre or central region of the brake pad, but which may be positioned elsewhere depending on the construction of the brake pad. In a twin piston caliper, in contrast, the pistons generally engage the rear of the pad symmetrically on either side of a centre line between opposite sides of the pad. But again, it is the effective pressure centre that normally dictates the respective positions of the twin pistons, so that when that centre is central of, or in a central region of the brake pad, symmetrical positioning of the pistons on either side of the centre line is appropriate. The piston position may however alter, if the effective pressure centre of the brake pad is not aligned with the centre line between opposite sides of the pad.

In a caliper according to the invention which includes a single piston, the actuating member of the electric actuator can permissibly engage the rear of the disc brake pad through an eccentric line of action relative to the generally central line of action of the piston of the hydraulic actuator. That is, the actuating member is offset circumferentially and/or radially from the piston centre line. Thus, the load imposed on the brake pad by the electric actuator is an eccentric load. The acceptability of that eccentric load or engagement is due to the normally static nature of the parking brake application, in which there is normally no relative movement between the friction lining and the braking surface. Thus, there is relatively no wear of the friction lining during a parking brake application, and accordingly the lining will not be caused to wear in an uneven manner despite being applied with an eccentric load or at least any wear will be negligible relative to that which occurs during service brake actuation. In this respect, the eccentric application of the parking load may reduce the efficiency of the parking brake, but despite this, any such efficiency reduction can be absorbed by the application of an increased actuating force applied by the electric actuator. By way of benefit however, the actuating member can apply a load to the disc brake pad which results in a reduced bending stress being applied through the bridge section of the caliper. This can be achieved by the load application being applied closer to the neutral axis of the caliper than the piston. The effective clamp radius and hence the resultant torque applied by the actuating member is also greater for this reason.

In a single piston caliper, the actuating member of the parking brake actuator preferably is disposed to have a line of action parallel to the line of action of the hydraulic piston and preferably as close to the line of action of the hydraulic piston as the construction of the caliper will allow, in order to minimise the eccentricity of the parking brake load and the bulk of the caliper.

Thus, the actuating member of the electric actuator preferably is disposed immediately adjacent the hydraulic piston. In a twin piston caliper, the electric actuating member preferably is disposed between the respective pistons. In this arrangement, the actuating member of the electric actuator can advantageously be arranged to act along a line of action which is substantially central or non-eccentric of the rear of the disc brake pad.

The hydraulic actuator of a caliper according to the invention advantageously can be of the same or similar operation and construction as prior art hydraulic actuators, so as to include a piston disposed within a cylinder, which is displaceable within a cylinder under hydraulic pressure to bear against the rear face of a disc brake pad, to shift the friction lining of the pad into engagement with a rotor. The arrangement includes any suitable hydraulic connections and sealing arrangement.

The electric actuator of a caliper according to the invention can take any suitable form and in one form, it includes an actuating member having a disc brake pad engaging portion and means to cooperate with electric drive means spaced from the engaging portion. The actuating member may be formed as an elongate rod and may be arranged for axial movement along its lengthwise axis, by rotational movement about the same axis. In this arrangement, a portion of the outer surface of the rod can be formed with a thread, say a male thread, that meshes with a fixed female mating thread, such as may be formed in the inner wall of a conduit or bore of the caliper which houses the rod, and rotation of the rod by the electric drive means causes it to shift axially within the bore by virtue of the threaded meshing engagement. That axial shift can be employed to shift the disc brake pad of the caliper into and out of engagement with the disc brake rotor.

In one arrangement, the electric drive means may include an electric motor which drives a worm in mating engagement with a worm gear, which in turn is fixed relative to the rod. The worm gear may be fixed to the rod in any suitable manner, such as by a key connection. By the above arrangement, drive of the worm by the electric motor rotates the worm gear connected to the rod, thereby rotating the rod about its lengthwise axis. The threaded connection between the rod and the caliper is such as to convert the rod rotation into linear axial movement, in one direction to shift the disc brake pad into engagement with the rotor. This arrangement may be employed with either a single or a twin piston caliper, or with calipers employing three or more pistons.

A caliper according to the invention may include a second or further electric actuator as required to properly apply the parking brake of a vehicle. For example, two electric parking brake actuators may be provided, or there may be a single electric actuator which includes two or more actuating members. The provision of more than a single electric actuator or actuating members may be based on the same or similar considerations that govern the provision of multiple hydraulic pistons.

The electric drive means of the actuator may be an electric motor as discussed above, or it can be one of a variety of other forms. For example, the electric actuator may include a transmission device to vary speed and torque characteristics thereof. Typically such a transmission device applied to an electric motor would reduce the speed at which the motor drives and would consequently increase the output torque. Such a transmission device can take the form of a gearbox such as eccentric, planetary, spur, worm, worm-wheel gearbox and if a screw drive of the kind described above is adopted, that may include any suitable forms of screw such as a ball screw, ACME, lead screw, or screw profiles that are asymmetrical, harmonic screw and a roller screw. Additionally, the linear translation of the actuating member can be as described, or can be eccentric cam facial or radial, or rack and pinion. The electric actuator may further include flexible links, such as steel membranes to multiply load with a reduction in travel. Double stage actuators may be employed. It will be appreciated that a wide variety of alternatives may exist in relation to the constructions and operation of the electric actuator.

The attached drawings show example embodiments of the invention of the foregoing kind. The particularity of those drawings and the associated description does not supersede the generality of the preceding broad description of the invention.

DETAILED DESCRIPTION

Figure 1:
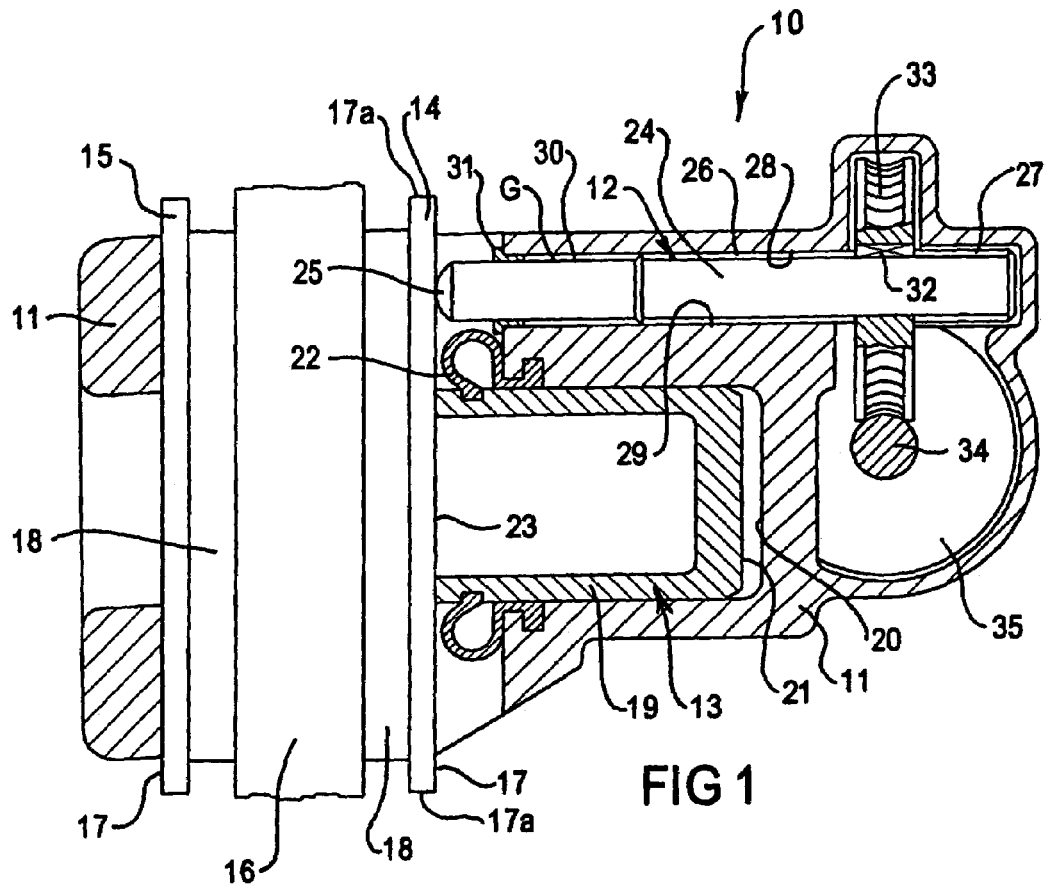
FIG. 1 is a cross-sectional view of a single piston integral disc brake caliper according to the invention.

The disc brake caliper 10 shown in FIG. 1 is not shown in full, but the components which are not shown would be apparent to a person skilled in the art. For example, the housing 11 does not show the bridging section which straddles the rotor, nor the anchor bracket which connects the housing 11 to the vehicle wheel assembly. FIG. 1 does however illustrate those features which are pertinent to the invention and in particular, FIG. 1 shows the housing 11 accommodating each of an electric parking brake actuator 12 and a hydraulic service brake actuator 13. As shown, the caliper 10 further includes a pair of disc brake pads 14 and 15, which are disposed on either side of a rotor 16. The pads 14 and 15 each include a supporting member 17 and a friction lining 18. Each of the disc brake pads 14 and 15 are supported in a known manner by the housing 11 for movement toward and away from the rotor 16. In brief terms, the pad 14 is shifted relative to the housing 11 toward and into engagement with one side of the rotor 16 and thereafter the pad 15 shifts with the housing into engagement with the other side of the rotor 16 to sandwich the rotor and to thereby apply a braking load thereto. The pad and housing movements are known and therefore further discussion in relation to that movement is not required. Movement of the pads 14 and 15 away from the rotor 16 when parking or service brake actuation is discontinued is achieved in a known manner and likewise it is not necessary to describe it in further detail.

Movement of the disc brake pad 14 into engagement with the rotor 16 is initiated by either of the electric or hydraulic actuators 12 or 13. The hydraulic actuator 13 includes a piston 19 disposed within a cylinder 20 and hydraulic fluid pressure applied to the rear 21 of the piston 19 is effective to shift the piston toward the rotor 16. Hydraulic fluid enters the cylinder 20 through a suitable hydraulic connection (not shown), while an annular seal 22 prevents leakage of fluid from within the cylinder 20. The piston 19 bears against the rear face 23 of the supporting member 17 of the brake pad 14, through substantially the centre of the pad 14 between upper and lower abutments I 7a thereof (as shown in FIG. 1) and between transverse opposite ends thereof (not shown ~n FIG. 1). By this arrangement, the friction lining 18 of the pad 14 is brought into engagement with the rotor under substantially even pressure across its full face, and thus the friction lining will tend to wear evenly and provide maximum braking efficiency. As discussed earlier, when the pad 14 engages the rotor 16, continued hydraulic actuation thereafter shifts the housing 11 and the pad 15 into engagement with the opposite side of the rotor 16 to sandwich the rotor and to produce the required braking effect.

The electric actuator 12 produces the same disc brake pad shifting movement as the hydraulic actuator 13, but via a different mechanism. The electric actuator 12 includes an actuating member in the form of an elongate rod 24. The rod 24 includes a disc brake pad engaging end or portion 25, a threaded male portion 26, and a keyway 27. The threaded male portion 26 is in threaded engagement with a mating female thread 28 formed on the internal surface of a bore 29 in the housing 11. The engaging end 25 is formed at one end of an unthreaded rod portion 30 of the rod 24 which is of a smaller diameter than the internal diameter of the bore 29 so as to define a gap G therebetween. The gap G permits a seal 31 to be inserted between the internal surface of the bore 29 and the outer surface of the rod portion 30, to seal against ingress of foreign matter.

Connected to the rod 24 by a key 32 is a worm gear 33, which is disposed in meshed engagement with a worm 34. The worm 34 is driven by an electric motor 35 to drive the worm gear 33 and thus to rotate the rod 24. By virtue of the threaded engagement between the threaded rod portion 26 and the bore thread 28, rotation of the rod 24 in one direction advances the rod toward the rotor 16 and rotation in the reverse direction retreats the rod 24 away from the rotor 16. By this mechanism, the engaging end 25 of the rod 24 can exert a force on the rear face 23 of the brake pad 14 to shift the pad 14 toward and into engagement with one side of the rotor 16. Thus, the electric drive is not restricted to an electric motor but can include an alternative electric drive, incorporating say a solenoid drive, or incorporating a piezo electric drive.

It is clear from FIG. 1 that the respective lines of action of each of the electric and hydraulic actuators 12 and 13 are spaced apart and parallel. As discussed earlier, the line of action of the piston 19 is through substantially the centre of the pad 14 and therefore necessarily, the rod 24 of the electric actuator 12 acts along an eccentric line of action relative to that of the piston 19. Accordingly, a load applied by the rod 24 to the rear face 23 of the pad 14 is an eccentric load which causes an uneven loading of the friction lining 18 of the pad 14 against the rotor 16. However, that eccentric loading is permissible given that there is normally no relative movement between the rotor 16 and the friction lining 18 that would tend to wear the lining in an uneven manner.

The caliper 10 advantageously can be arranged to provide reduced bending stress through the bridge section of the caliper during parking brake actuation, by positioning the rod 24 closer to the neutral axis of the caliper bridge section than the piston 19. As shown in FIG. 1, the rod 24 may be positioned closer to abutment 17A than piston 19. Abutment 17A defines an outside edge of support member 17 and abutment 17A is closer to the neutral axis of the caliper section than a center of support member 17 where the center of piston 19 acts. The reduced bending stress is relative to prior art service/parking brake calipers discussed earlier, in which the piston is the disc pad engaging component of each actuator.

Figure 2:
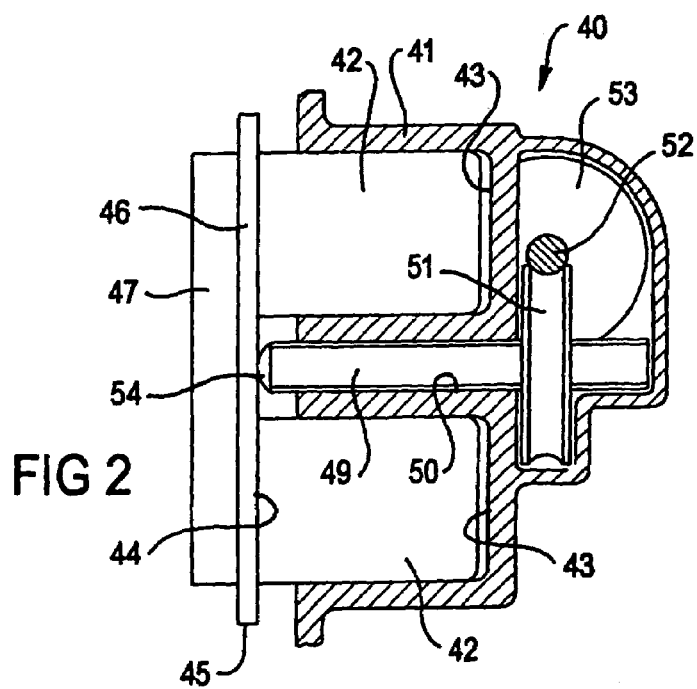
FIG. 2 is a cross-sectional view of a twin piston integral disc brake caliper according to the invention.

FIG. 2 is a cross-sectional view of a twin piston disc brake caliper 40 according to the invention. The caliper 40 includes a housing 41, which accommodates the hydraulic service brake actuator and the electric parking brake actuator. The hydraulic actuator includes a pair of pistons 42, each of which is disposed in a respective piston cylinder 43 for engagement against the rear face 44 of a disc brake pad 45. In the FIG. 2 embodiment, the caliper 40 includes a further disc brake pad (not shown) disposed in spaced apart facing relationship with the pad 45 in the same manner as shown in FIG. 1. The pad 45 includes a friction lining supporting member 46 and a friction lining 47 supported thereon.

The arrangement of the hydraulic actuator in the FIG. 2 embodiment can be operationally the same as the FIG. 1 embodiment. In other words, apart from having two pistons 42, the operation of the pistons and their arrangement can be the same as that shown in FIG. 1. Accordingly, further detail of the hydraulic actuator of FIG. 2, for example such as in respect of the hydraulic sealing arrangement, can be assumed to be the same as the FIG. 1 embodiment.

The caliper 40 includes an electric parking brake actuator 48 which has the same construction as the electric parking brake actuator 12 of FIG. 1. That is, it includes an elongate rod 49 housed within a bore 50 formed in the housing 41 and the rod includes a thread formed on the outer surface thereof for threadably engaging a complementary thread formed on the internal surface of the bore 50. A worm gear 51 is attached by key connection to the rod 49 and the worm gear is driven by a worm 52, which itself is driven by an electric motor 53. The rod 49 is movable axially along its lengthwise axis.

The FIG. 2 embodiment differs from that of the embodiment of FIG. 1, by the non-eccentric line of action of the electric actuator 48. That is, the rod 49 acts through substantially the centre of the pad 45, while the pair of pistons 42 act symmetrically on either side of the rod 49. Thus, while the eccentric loading action of the electric parking brake actuator of the FIG. 1 embodiment is not considered to have substantial disadvantageous effects, such eccentric loading can be avoided in a twin piston caliper.

The FIG. 2 embodiment also shows a pad 54 disposed between the engaging end 55 of the rod 49 and the rear face 44 of the friction lining supporting member 46. The pad 54 can be a hardened steel pad and its function is to better distribute the load of the rod 49 to the supporting member 46 than would be the case with the point load arrangement shown in FIG. 1. The pad 54 could be connected to either the engaging end 55, or to the supporting member 46.

The invention described herein is susceptible to variations, modifications and/or additions other than those specifically described and it is to be understood that the invention includes all such variations, modifications and/or additions which fall within the spirit and scope of the above description.

The invention claimed is:

1. A disc brake caliper, for use with a disc brake rotor having a first side and a second side, the disc brake caliper comprising:

a first mounting portion and a second mounting portion, said first mounting portion adapted for being disposed adjacent the first side of the disc brake rotor and said second mounting portion adapted for being disposed adjacent the second side of the disc brake rotor;

a first brake pad mounted to said first mounting portion and having a first side adapted for engaging the disc brake rotor and a second side opposite to said first side and a second brake pad mounted to said second mounting portion, said first brake pad and said second brake pad being adapted for being positioned adjacent opposite sides of the disc brake rotor in facing relationship therewith; and a hydraulic service brake actuator and a non-hydraulic electric parking brake actuator, each of which is operable independently of the other for service brake operation and parking brake operation, respectively, each of said actuators being arranged for actuation against said second side of said first brake pad for displacing said first brake pad away from said first mounting portion and into engagement with the disc brake rotor, said hydraulic service brake actuator and said non-hydraulic electric parking brake actuator having positions of actuation on said second side of said first brake pad at positions which are spaced apart.

2. The disc brake caliper according to claim 1, wherein said hydraulic service brake actuator includes a hydraulic actuating member and said non-hydraulic electric parking brake actuator includes an electric actuating member, wherein said hydraulic actuating member and said electric actuating member are arranged to engage said second side of said first brake pad at said spaced apart positions.

3. The disc brake caliper according to claim 2, further comprising a friction lining disposed on said first brake pad, wherein said hydraulic service brake actuator is arranged to engage said second side of said first brake pad at a position on said first brake pad to cause said friction lining to apply a substantially even pressure to the disc brake rotor across a face of said friction lining which engages the disc brake rotor.

4. The disc brake caliper according to claim 3, wherein said hydraulic actuating member is arranged to engage said second side of said first brake pad in the region of the effective pressure centre of said first brake pad and said electric actuating member being arranged to engage said second side of said first bake pad eccentrically relative to said hydraulic actuating member.

5. The disc brake caliper according to claim 3, wherein said hydraulic actuating member is arranged to engage said second side of said first brake pad at a position generally centrally of said first brake pad and said electric actuating member is arranged to engage said second side of said first brake pad eccentrically relative to said hydraulic actuating member.

6. The disc brake caliper according to claim 5, wherein said electric actuating member is arranged to engage said second side of said first brake pad closer to an outside edge of said first mounting portion than said hydraulic actuating member.

7. The disc brake caliper according to claim 2, further comprising a friction lining disposed on said first brake pad, wherein said hydraulic service brake actuator includes a pair of hydraulic actuating members disposed generally symmetrically on either side of a generally central position of said first brake pad, said pair of hydraulic actuating members adapted for engaging said second side of said first brake pad at positions to cause said friction lining of said first brake pad to apply a substantially even pressure to the disc brake rotor across a face of said friction lining, said electric actuating member being disposed substantially midway between said pair of hydraulic actuating members and substantially centrally of said first brake pad.

8. The disc brake caliper according to any one of claims 2 to 7, wherein said hydraulic actuating member is a hydraulic piston.

9. The disc brake caliper according to any one of claims 2 to 3, wherein said electric actuating member of said non-hydraulic electric parking brake actuator is an elongate rod having a lengthwise axis.

10. The disc brake caliper according to claim 9, wherein said elongate rod includes a disc brake pad engaging portion for cooperating with an electric drive unit, said electric drive unit spaced from said disc brake pad engaging portion, said cooperation permitting said electric drive unit to displace said elongate rod toward and away from the disc brake rotor for parking brake actuation and release.

11. The disc brake caliper according to claim 10, wherein said electric drive unit is operable to displace said elongate rod axially by rotating said elongate rod about said lengthwise axis.

12. The disc brake caliper according to claim 11, further comprising a bore in said housing, a pair of mating threads disposed on said elongate rod and a wall at least partly defining said bore, wherein said elongate rod is disposed at least partly within said bore whereby said elongate rod is in threaded engagement with said bore, and whereby rotation of said elongate rod about said lengthwise axis causes an axial shift of said elongate rod relative to said bore.

13. The disc brake caliper according to claim 12, said cooperation includes a worm gear fixed to said elongate rod and a worm driven by said electric drive unit, said worm cooperating with said worm gear.

* * * * *

UNITED STATES PATENT AND TRADEMARK OFFICE
CERTIFICATE OF CORRECTION

| | | |
|---|---|---|
| PATENT NO. | : 7,455,152 B2 | Page 1 of 1 |
| APPLICATION NO. | : 10/776539 | |
| DATED | : November 25, 2008 | |
| INVENTOR(S) | : Nui Wang | |

It is certified that error appears in the above-identified patent and that said Letters Patent is hereby corrected as shown below:

Title Page;
On the face of the patent (57) ABSTRACT, line 11, delete "are" and insert therefor --is--.
Column 1, line 11, "disclosure" should read --disclosures--.
Column 1, line 41, following "and" insert --,--.
Column 2, line 6, following "thereof" delete ",".
Column 2, line 53, following "use" delete ",".
Column 3, line 3, following "and" insert --,--.
Column 3, line 5, following "appreciated" insert --,--.
Column 3, line 8, following "and" insert --,--.
Column 3, line 24, following "caliper" delete ",".
Column 3, line 41, "alter" should read --altered--.
Column 4, line 31, following "and" insert --,--.
Column 5, line 50, delete "are" and insert therefor --is--.
Column 6, line 8, delete "~n" and insert therefor --in--.
Column 6, line 46, delete "say" and insert therefor --for example--.
Column 8, line 40, delete "bake" and insert therefor --brake--.
Column 10, line 9, following "12" insert --wherein--.

Signed and Sealed this

Sixteenth Day of February, 2010

David J. Kappos
*Director of the United States Patent and Trademark Office*